United States Patent
Stradley

(10) Patent No.: US 10,747,181 B2
(45) Date of Patent: Aug. 18, 2020

(54) ELECTRONIC TALKING STICK

(71) Applicant: Suzanne Stradley, Palm Desert, CA (US)

(72) Inventor: Suzanne Stradley, Palm Desert, CA (US)

( * ) Notice: Subject to any disclaimer, the term of this patent is extended or adjusted under 35 U.S.C. 154(b) by 0 days.

(21) Appl. No.: 15/987,173

(22) Filed: May 23, 2018

(65) Prior Publication Data

US 2019/0361403 A1  Nov. 28, 2019

(51) Int. Cl.
*G04B 47/00* (2006.01)
*G04F 3/06* (2006.01)
*H04R 1/08* (2006.01)

(52) U.S. Cl.
CPC ............... *G04B 47/00* (2013.01); *G04F 3/06* (2013.01); *H04R 1/08* (2013.01)

(58) Field of Classification Search
CPC .................. G04F 3/00; G04F 3/06; G04F 3/08
See application file for complete search history.

(56) References Cited

U.S. PATENT DOCUMENTS

| | | | | |
|---|---|---|---|---|
| 3,845,614 A * | 11/1974 | Christ | .................. | G04B 25/005 368/253 |
| 4,995,018 A * | 2/1991 | Edwards | ................. | G04F 1/005 368/107 |
| 5,978,939 A * | 11/1999 | Mizoguchi | .......... | G06F 11/0757 713/502 |
| 6,326,883 B1 * | 12/2001 | Whitehead | .............. | G04F 1/005 340/309.3 |
| 8,077,552 B1 * | 12/2011 | Pope | ......................... | G04F 3/08 368/109 |
| 8,358,203 B1 * | 1/2013 | Perry | ..................... | G04G 11/00 340/309.16 |
| 10,026,275 B1 * | 7/2018 | Riley | ....................... | G08B 5/36 |
| 2006/0031484 A1 * | 2/2006 | O'Neill | ................... | G04F 10/00 709/224 |
| 2006/0133215 A1 * | 6/2006 | Gordon | .................. | G04G 11/00 368/79 |
| 2011/0080411 A1 * | 4/2011 | Wikkerink | ............... | G04G 9/00 345/473 |
| 2012/0226997 A1 * | 9/2012 | Pang | ................... | H04L 65/4038 715/753 |
| 2015/0378314 A1 * | 12/2015 | Nakabayashi | ......... | G04G 11/00 368/108 |

(Continued)

OTHER PUBLICATIONS

Color Alert Kitchen Timers, Jun. 25, 2014, Vat19, full document, retrieved on Oct. 29, 2019 from https://www.vat19.com/item/color-alert-kitchen-timers-analog-digital (Year: 2014).*

*Primary Examiner* — Daniel P Wicklund
(74) *Attorney, Agent, or Firm* — Donald R. Boys; Central Coast Patent Agency LLC

(57) ABSTRACT

An electronic talking stick has a body having an outer casing, of a size to fit in a user's hand, a power supply powering circuitry within the body, an electronic timer operable within the body, an on/off switch, and an alert mechanism adapted to cause a user-noticeable alert at specific times according to the timer. Upon applying power by the on/off switch, the timer begins to count down from a pre-programmed time, wherein the alert mechanism generates a timed-out alert when the timer reaches zero, and wherein removing power from the circuitry resets the timer.

17 Claims, 6 Drawing Sheets

(56) References Cited

U.S. PATENT DOCUMENTS

2016/0091866 A1* 3/2016 Jersa, III .............. B42F 1/006
368/278
2019/0073998 A1* 3/2019 Leblang ............... G10L 15/065

* cited by examiner

ELECTRONIC TALKING STICK

BACKGROUND OF THE INVENTION

1. Field of the Invention

The instant invention is in the technical are of hand-held electronic devices, and in one embodiment comprises circuitry of a microphone

2. Description of Related Art

In native-American history there is known use of a decorated object, in some instances a branch or stick, that is passed between participants of a conference or discussion, which is used to pass along permission to talk, and the object is called a talking stick. The person to whom the talking stick is passed has the floor, so to speak, until the talking stick is passed to another. Use of a talking stick has progressed to the present day and is an effective means to control interaction among a group of people who wish to express opinions.

One problem with the conventional, historic talking stick stems from the very familiar circumstance that, in any discussion, there always seems to be one person, at least, that tends to dominate the discussion. Since the permission to speak doesn't pass until the stick passes, this can be a problem.

What is clearly needed is an electronic talking stick that may be used to manage interaction among participants in a discussion, that has considerable additional functionality.

BRIEF SUMMARY OF THE INVENTION

In an embodiment of the present invention, an electronic talking stick is provided, comprising a body having an outer casing, of a size to fit in a user's hand, a power supply powering circuitry within the body, an electronic timer operable within the body, an on/off switch, and an alert mechanism adapted to cause a user-noticeable alert at specific times according to the timer. Upon applying power by the on/off switch, the timer begins to count down from a pre-programmed time, wherein the alert mechanism generates a timed-out alert when the timer reaches zero, and wherein removing power from the circuitry resets the timer.

In one embodiment of the invention, the alert mechanism is adapted to generate audible sound, and the alert generated when the timer reaches zero is a sound. Also, in one embodiment the alert mechanism is adapted to generate visible light, and the alert generated when the timer reaches zero is a red light. Also, in one embodiment the alert mechanism generates a first alert when the timer counts down to a time about ten percent of the pre-programmed time period, as an alert to a speaker holding the electronic talking stick that time to speak is close to timing out, and generates the timed-out alert when the timer reaches zero time, as an alert that time to speak has expired. And in one embodiment, the alert mechanism is adapted to generate visible light in green, yellow and red wavelengths, the alert mechanism emits a green light when powered on and the timer begins timing down, a yellow light at the first alert, and a red light as the timed-out alert.

In one embodiment the electronic talking stick further comprises a microprocessor programmed to control processes of the electronic talking stick. Also in one embodiment, the electronic talking stick further comprises a USB port coupled to the microprocessor, enabling a user to program the microprocessor. In one embodiment the power supply is a rechargeable battery, which is chargeable through the USB port. IN one embodiment the electronic talking stick further comprises a display screen implemented on the body and coupled to the microprocessor, the display screen displaying time remaining during countdown. And in one embodiment the electronic talking stick further comprises a microphone having an input interface.

In one embodiment the electronic talking stick further comprises a speaker implemented in the electronic talking stick, wherein speech captured by the microphone is broadcast by the speaker. In another embodiment the electronic talking stick further comprises wireless communication circuitry establishing communication with a remote device. In one embodiment, wherein the wireless communication circuitry operates in Bluetooth™ protocol, and pairs with a Bluetooth™ speaker external to the electronic talking stick, wherein speech captured by the microphone is broadcast by the Bluetooth™ speaker.

In another aspect of the invention, a communication system is provided, comprising a computerized platform comprising a CPU, a data storage device coupled to the CPU, Bluetooth™ pairing circuitry, a speaker having circuitry coupled to the CPU, and a display screen having display circuitry coupled to the CPU, and an electronic talking stick having a body with an outer casing, of a size to fit in a user's hand, a power supply powering circuitry within the body, an electronic timer operable within the body, an on/off switch, an alert mechanism adapted to cause a user-noticeable alert at specific times according to the timer, a microphone having an input interface, and Bluetooth™ communication circuitry. Speech captured by the microphone is transmitted in Bluetooth™ protocol to the computerized platform and broadcast by the speaker in the computerized platform, and wherein, upon applying power to the electronic talking stick the timer counts down from a preprogrammed time, transmits time remaining by Bluetooth™ protocol to the computerized platform, which displays time remaining on the display of the computerized platform.

In one embodiment of the system, speech captured by the microphone and transmitted in Bluetooth™ protocol to the computerized platform is stored in the data storage device of the computerized platform. Also, in one embodiment, the speech captured by the microphone and transmitted in Bluetooth™ protocol to the computerized platform is stored in the data storage device of the computerized platform, as separate files for each new speaker. In one embodiment the system further comprises a local area network (LAN) coupled to the CPU of the computerized platform, the LAN having at least one network-connected server and data repository, and wherein input to the computerized platform is transmitted to the at least one network-connected server.

In one embodiment the system further comprises a biometric input on the electronic talking stick, and personal profiles for individual persons stored in the data repository at the network-connected server, and wherein biometric input is used to associate input by a speaker with information in a profile associated with the biometric input. In one embodiment the computerized platform is one of a smartphone, a pad device, or a laptop computer, further comprising an input system whereby a speaker interacts with the one or more network-connected servers. And in one embodiment, the speaker, through the smartphone, pad device, or laptop computer, accesses and plays image or audio files from a personal profile associated with the speaker in real time while speaking with the electronic talking stick.

DETAILED DESCRIPTION OF THE INVENTION

Figure 1:
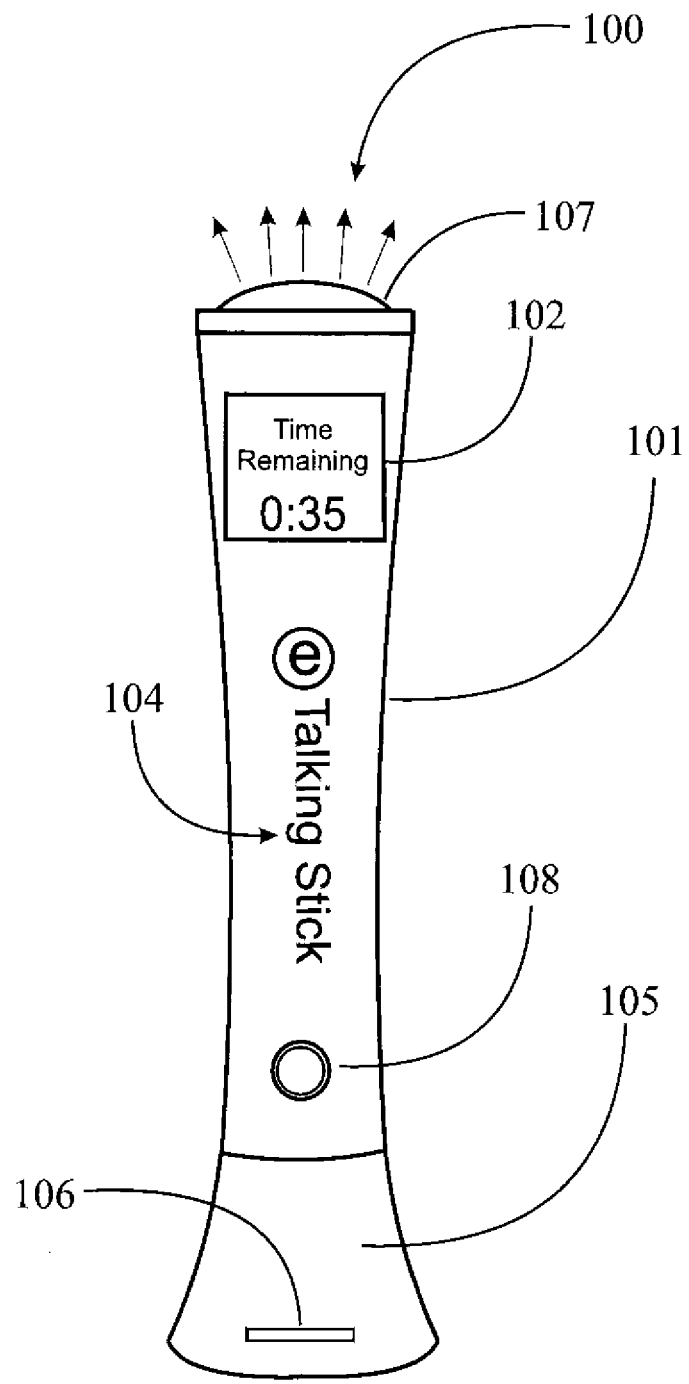
FIG. 1 is an elevation view of an electronic talking stick in one embodiment of the present invention.

FIG. 1 is an elevation view of an electronic talking stick 100 in an embodiment of the present invention. Electronic talking stick 100 in this example is a hand-held device having a housing 101 with an elongated shape from a lower end to an upper end that has a circular cross-section that diminishes in diameter from a larger lower end to a minimum diameter between the lower end and the upper end, and then expands to a larger diameter from the minimum diameter to the upper end, although the circular cross section is not a limiting concept in the invention. The circular shape is convenient to make the electronic talking stick comfortable to hold in one hand.

In this example electronic talking stick 100 has a timer implemented inside housing 101, the timer communicating with a small display 102, close to the upper end, that in one instance displays time remaining to speak for a person holding the electronic talking stick. Display 102 may be LCD, LED or any other technology that is appropriate.

The electronic talking stick has a base portion 105 in this example with a planar underside, so the electronic talking stick may be set on a table surface. There is an on/off button 108, which may, in some embodiments be a slider switch or rotary switch, and, in some embodiments, an optional USB port 106, although some embodiments do not employ USB. In addition, there is, in this example, a lighting system 107 that in some embodiments may emit green, yellow and red light from a dome-shaped upper end. There may or may not be a logo 104 on the electronic talking stick.

Figure 2:
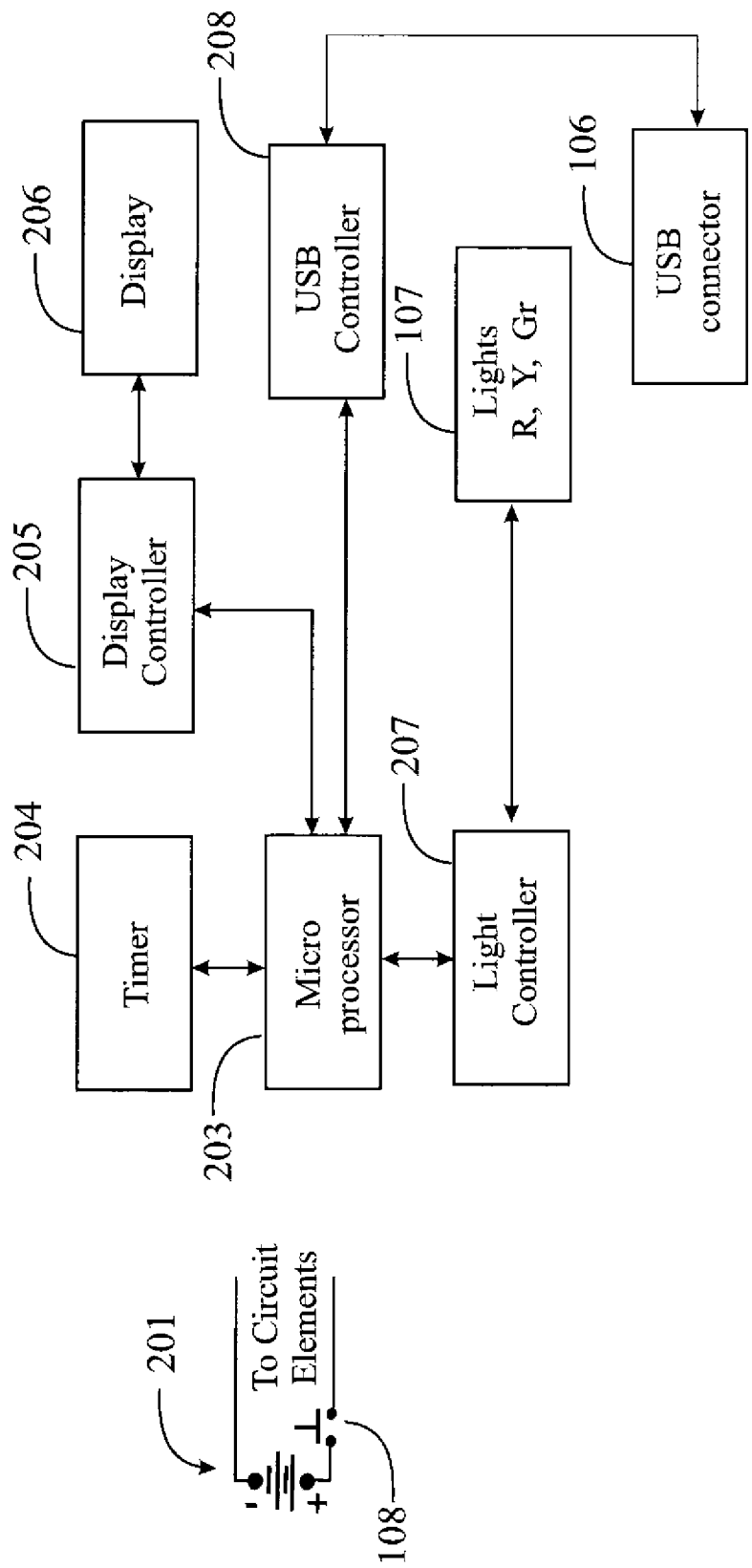
FIG. 2 is a simplified diagram of electronic circuitry for the electronic talking stick of FIG. 1.

FIG. 2 is a somewhat simplified exemplary circuit diagram for electronic talking stick 100 of FIG. 1. The electronic talking stick in the embodiment of FIG. 1 is powered by a battery 201, which supplies power to electronic elements through on/off switch 108. Switch 108 is shown in this example as a push-button switch, and in this embodiment requires functionality, but familiar to those with skill in the art, to render the switch activity as a toggle, such that pressing once may turn power on to the electronic elements, and a second press turns power off. In alternative embodiments the on/off switch may take other forms, such as a toggle or a rotary switch.

Battery 201 may be a rechargeable battery, which may be recharged by a DC input at a port not shown, but well-known in the art, and in some circumstances may also be charged through the USB port and circuitry. In some implementation power may be by replaceable batteries, such as AA batteries, in which case there is a battery bay and closure to facilitate battery replacement.

In this example order of functions is controlled by a microprocessor 203, which is programmed for the functionality. In other embodiments the control may be through a programmable chip or firmware device. In one embodiment there is a USB connector 106 through a USB controller 208, to the microprocessor, through which, connected to a computerized device, executing a compatible application, programming of the microprocessor may be established and amended, including settings for thresholds. A USB controller is shown connected to microprocessor 203 and to USB connector 106.

In one embodiment, when power is applied by switch 108, microprocessor 203 resets a timer 204, which begins to count down from a preprogrammed time period, which is synonymous with an agreed-to time to talk in a meeting or conference. This time to talk may be hard-programmed, or in some embodiments may be adjustable for a particular meeting or purpose. At the same initiated time microprocessor 203 controls a light controller 207 to emit green light for light 107 in FIG. 1.

One may assume that when on/off switch 108 is activated, providing power to the microprocessor and other electronic elements, that the electronic talking stick may have been passed to a new participant in a meeting or conference, and that receiving participant has activated the electronic talking stick. According to known rules the receiving person may now start talking and hold the floor for the agreed-to time period. Also, when power is applied, microprocessor 203 signals a display controller 205 which controls display 102 of FIG. 1. In one circumstance the display may immediately render the agreed-to time period for each participant to talk, and then count down in seconds.

For exemplary purpose, assume that the agreed-to time to talk is five minutes. In this example timer 204, once activated, counts down in seconds from five minutes, and light 107 is green, indicating that the speaker is well within the agreed-to time to talk. Display 102 indicates time remaining, counting down.

There may be a pre-set time to indicate to the speaker, and to others in a meeting, that the speaker is near the end of the time to talk, in this case five minutes. At 30 seconds remaining, microprocessor 203 may signal light controller 207 to change the light from green to yellow. In another embodiment, the green light goes off at one minute before the end of the time period, and the yellow light comes on with 30 seconds to the end. The yellow light indicates to the speaker, and other participants, that time is close to expiration. The yellow light remains in effect until time expires, at which time microprocessor 203 signals light controller 207 to turn light 107 to red. The red light indicates to the speaker and other participants that the time to speak for the current speaker has expired.

When the red light comes on, agreed-to behavior is that the current speaker yields to a next speaker. The current speaker may activate switch 202, which operates as a toggle, to turn power off to the electronic elements, at which time the timer resets and light 107 is extinguished. Display controller 205 may also turn off display 102.

At the end of time to speak for one speaker, the electronic talking stick is to be passed to a next speaker. The next speaker, if the next earlier speaker turned off the electronic talking stick, may activate switch 108 to restart the timing, display, and lighting process. If the previous speaker did not turn off the electronic talking stick, the next speaker may do so, and then reactivate to begin speaking.

In this simple embodiment the electronic talking stick performs the functions of an historic talking stick, with additional functionality of displaying time to talk, and a light or other alert functionality with go, caution and stop indication, with additional functionality to reset and reply the process for each new speaker.

As described, the purpose of the lights 107, or other alerts, is to notify the speaker and to other participants. In alternative embodiments alerts may be audible alerts rather than lights, or in addition to lights. For example, in one embodiment, at the 30-second mark before time expires, the electronic talking stick may emit an audible tone, or even a verbal phrase. Vibration may be used as well. Alerts then may be any combination of lights, audible signals, or vibration.

Figure 3:
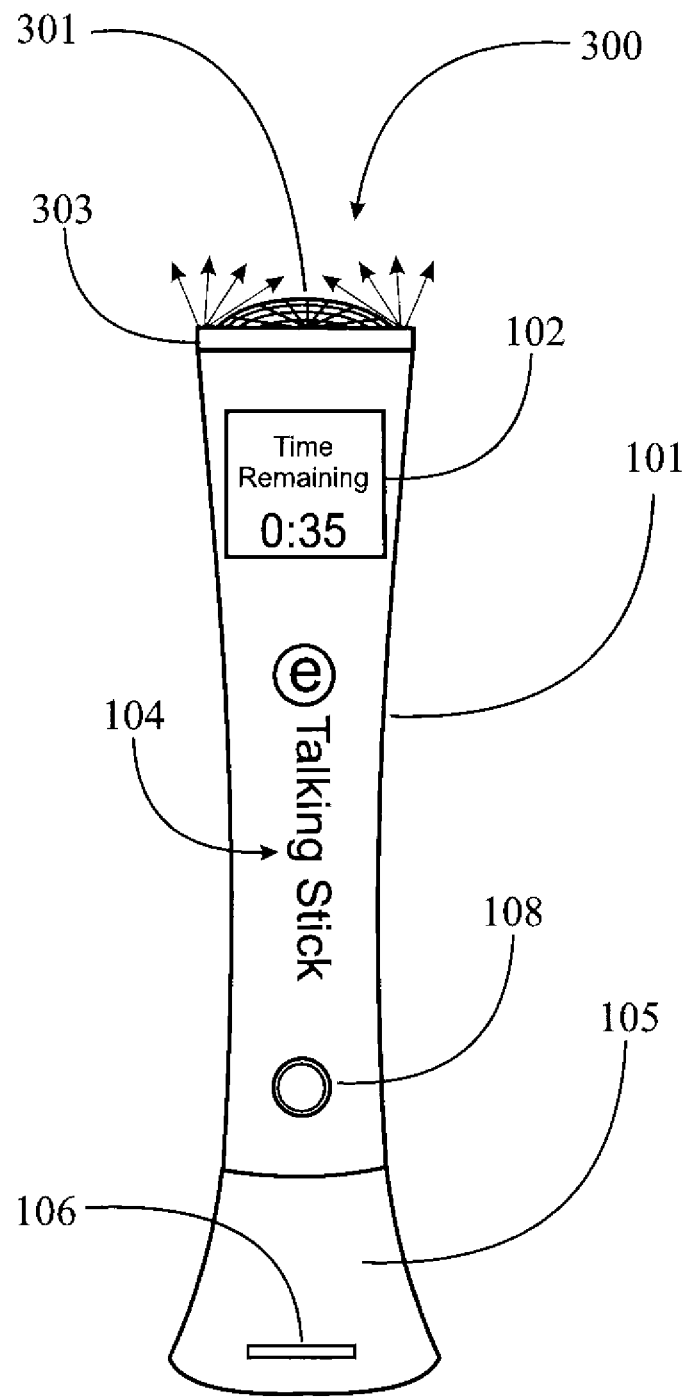
FIG. 3 is an elevation view of an electronic talking stick in an alternative embodiment of the invention.

FIG. 3 is an elevation view of an electronic talking stick in an alternative embodiment of the invention. In talking stick 300 of FIG. 3, many of the elements and functions described above with reference to FIGS. 1 and 2 may be repeated, and elements may bear the same element numbers as in the device of FIG. 1.

A significant difference between the electronic talking stick 100 of FIG. 1, and the electronic talking stick 300 of FIG. 3, is inclusion of a microphone having an audio input interface 301. Electronic talking stick 300 has all of the elements and functionality described above for electronic talking stick 100, plus functionality of a microphone for receiving audio speech of a person holding or using the electronic talking stick and transmitting that speech to an internal or external amplification and speaker system. In this instance, the speaker interface may be in the position of the lights in FIG. 1, but in FIG. 3 the lights may be from a light ring 303 surrounding the microphone interface.

Figure 4:
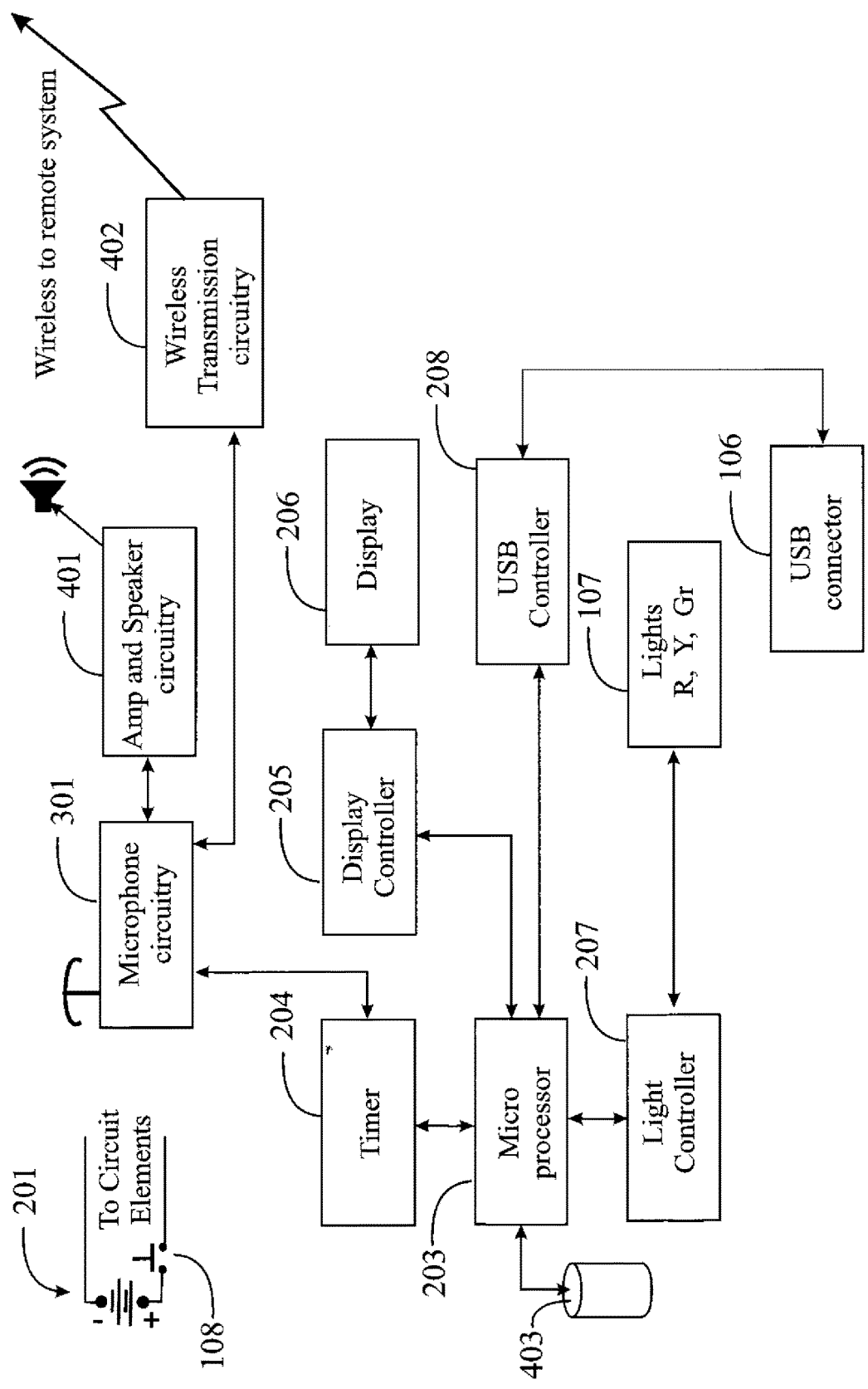
FIG. 4 is a diagram similar to that of FIG. 2, showing the elements of FIG. 2 and additional elements in an embodiment of the invention.

FIG. 4 is a block diagram similar to that of FIG. 2, showing the elements of FIG. 2, microphone and circuitry 301, and an internal amplifier and speaker 401. A near-field wireless communication circuitry 402 is shown as well, which may in some instances be Bluetooth™, which is functional to transmit audio data from microphone 301 to a system, not shown, external to the electronic talking stick. It should be understood that both the internal speaker and the external functionality may be present in the same implementation, but not necessarily so. One or the other may be present.

FIG. 4 also illustrates a data repository 403 coupled to microprocessor 203. In some embodiments repository 403 may store code to execute and data for functionality of the electronic talking stick. Such code a data may be amendable by a user through the USB system. In other embodiments speech may be recorded into repository 403 and speech data may be retrievable through USB port 106. The data repository in some embodiments may also store recorded messages that may be played through speaker circuitry 401, or even through external systems via transmission circuitry 402.

In some other aspects of the invention significant additional functionality is provided through external systems that may be reached through wireless transmission circuitry 402. One example is ability to pair with an external Bluetooth™ speaker system, so that a person using the electronic talking stick may have his/her speech provided through the external speaker, for benefit of all participants in a meeting or conference.

Figure 5:
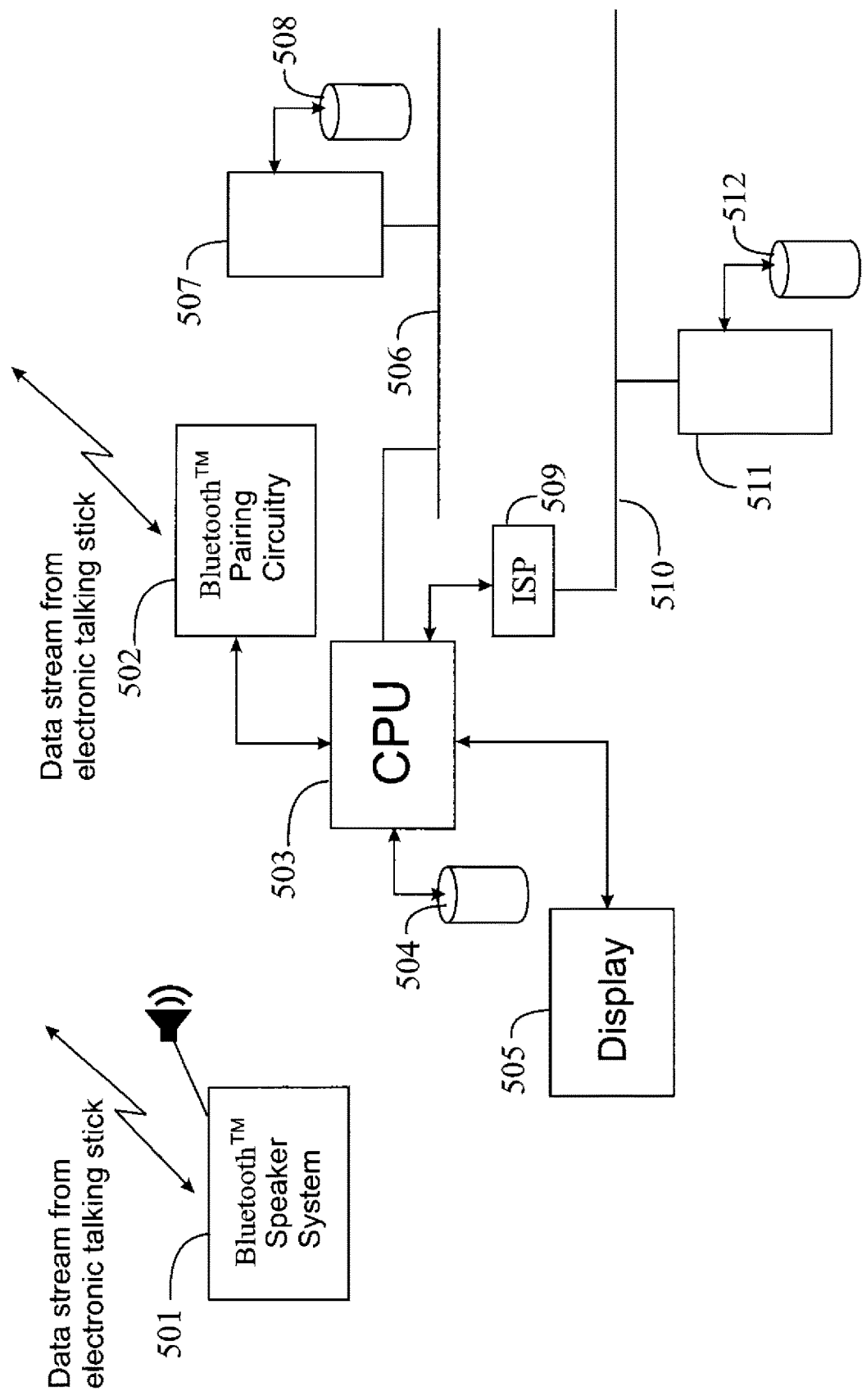
FIG. 5 is a block diagram illustrating optional elements in systems external to the electronic talking stick, that may be employed for additional functionality in an embodiment of the invention.

FIG. 5 is a block diagram illustrating optional elements in systems external to the electronic talking stick, that may be employed for additional functionality in concert with use of the electronic talking stick. As one example, Bluetooth™ speaker system 501 may pair with the electronic talking stick, and broadcast speech from a user of the electronic talking stick. System 501 may be, in some implementation a single speaker in a location that audio is close to the speaker and other participants in a conference or may be a more sophisticated system comprising several speakers in an upscale sound system.

In another implementation a computerized system controlled by a CPU 503 may receive signals through Bluetooth™ pairing circuitry 502 and store audio files in data repository 504. In one implementation, as each participant speaks, audio is recorded, and an audio file is implemented and saved as a separate file each time a user turns the electronic talking stick off to pass to another speaker. This action, as described above, may be a simple reset of the circuitry of the electronic talking stick.

In another embodiment, as a user is speaking into the electronic talking stick, CPU 503 may be functional to perform voice-to-text on the audio input and display the text in near real time on a display 505, which may be visible to the speaker and to other participants. Transcribed speech may also be saved in repository 504 and associated with saved audio for each speaker that used the electronic talking stick. CPU 503 may be, in some embodiments, part of a general-purpose computer system operated by an organization or enterprise with which speakers in a conference are associated, and there may be regular management and reports generated using the saved audio and text, which may be associated with meeting time and day, and purpose for the organization or enterprise.

In other embodiments of the invention CPU 503 may be coupled to a Local area Network (LAN) 506 in an enterprise, and there may be servers represented by server 507 coupled to the LAN, and to data repositories represented by 508. In a dedicated system in an enterprise, like a division of a corporation, employees may have profiles stored in data repositories 508 coupled to servers 507. CPU 503 may be coupled as well, through an Internet Service Provider that may be any one of several devices and protocols, to a wide area network (WAN) like the well-known Internet network, where a great many sites may be connected.

Figure 6:
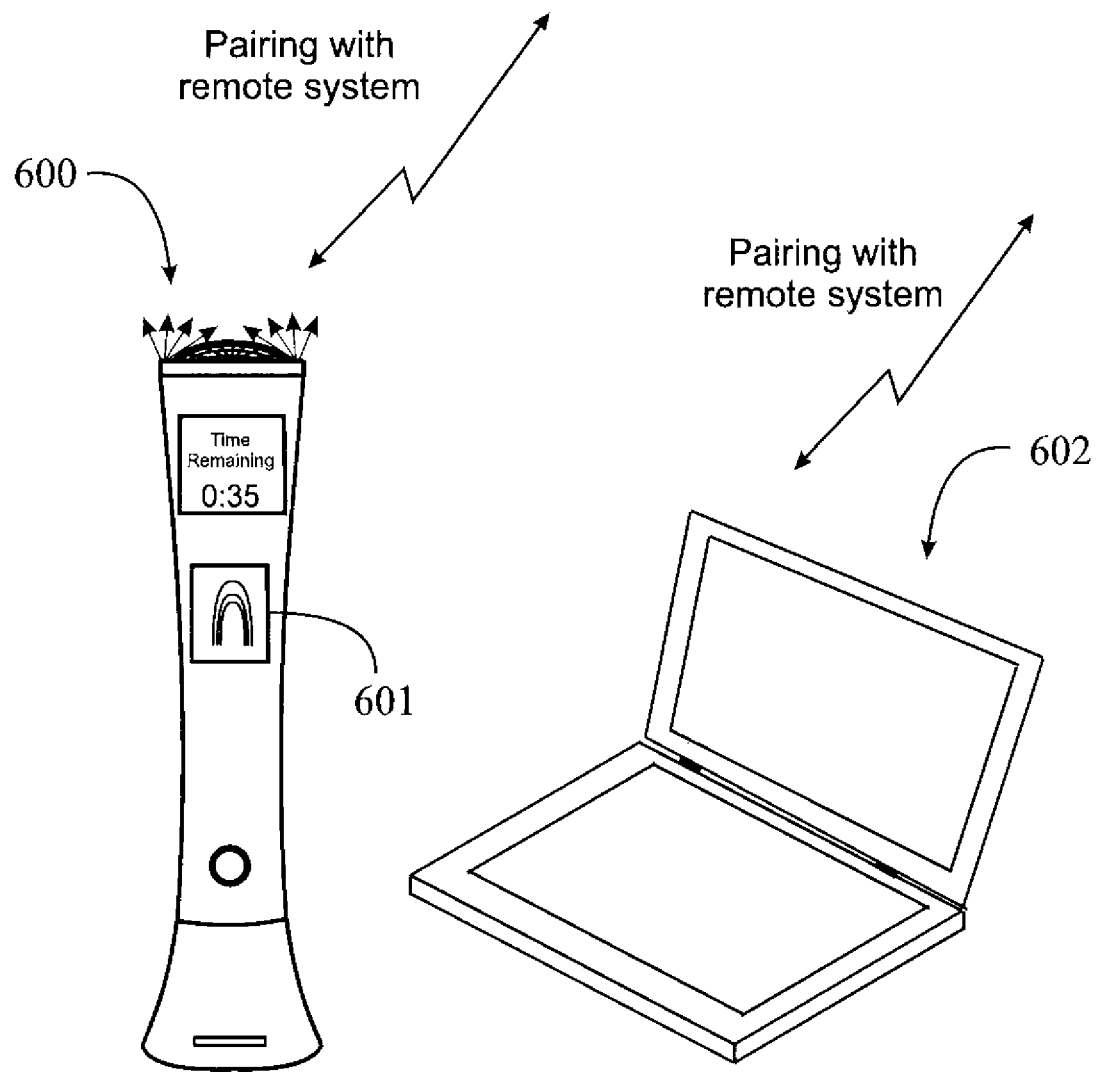
FIG. 6 illustrates an electronic talking stick paired to an external system as illustrated in FIG. 5, and a pad device in an embodiment of the invention.

FIG. 6 illustrates an electronic talking stick 600 paired to an external system as illustrated in FIG. 5, and a pad device 601 also paired with the same external system, external simply meaning outside the circuitry of the electronic talking stick. Electronic talking stick 600 has a biometric input 601, in this example a fingerprint pad, with which a speaker may identify herself to the computerized external system, accessing, for example, data of various sorts that may be stored in that user's profile in, for example data repository 508 coupled to server 507 on LAN 506. It was described above, that in an enterprise setting, employees may have stored profiles with identity, job description, pictures, and data of many sorts. The speaker through such data access may use another device, such as pad device 602, to access and utilize stored data on that user's profile. The speaker may, for example, through an app executing on device 602, cause music or other sound effects to play over the external speaker system in concert with her own speech in real time in a conference. Explosions, drum rolls, music clips and more may be used. The speaker may also display image files on display 505 in concert with speech in real time. All may be recorded as a session for that speaker.

In other embodiments a smart phone or laptop, or other smart device may be used with wireless connectivity to external systems. It should also be noted that biometric input may be voice recognition or another form of bio input, other than fingerprint. Returning to FIG. 5, it may be noted that employees in an enterprise may have computerized platforms connected to or connectable to LAN 506, and these employees may, in some embodiments, access meeting data stored, for example, in repository 504 during or after a meeting. It may be propitious, for example, for a participant in a conference enhanced by use of an electronic talking stick, to access and review what a previous speaker has said, before that participant has the electronic talking stick and permission to speak. An upcoming speaker might well do so through a smart device paired to the external system, during the time of a conference.

Given the descriptions above of the various embodiments, and the systems and technology involved, a person of skill in the art will be aware that there are many more use cases and applications that may be described within the scope of the invention. Further, each elements and function as described above may be combined with others to provide new embodiments of the invention. The scope of the invention is limited only be the claims below.

The invention claimed is:

1. An electronic talking stick, comprising:
a smooth, opaque body, with an elongated shape from a lower end to an upper end that has a circular cross-section that diminishes in diameter from a larger lower end to a minimum diameter between the lower end and the upper end, and then expands to a larger diameter from the minimum diameter to the upper end, of a size to be held in a user's hand, and to be passed from the user to another user;
a power supply powering circuitry within the body;
an electronic timer operable within the body;
an on/off switch for applying and removing power;
a light ring implemented at the upper end around the body, adapted to emit red, yellow, and green light at specific times according to the timer;
a microphone implemented at the upper end; and
a display screen implemented in the body at the upper end below the light ring to be clearly visible to the user holding the electronic talking stick upright in a hand of the user, the display screen coupled to the microprocessor, displaying time remaining during countdown;
wherein, upon applying power by the on/off switch, the timer begins to count down from a pre-programmed time, emits red light from the lighting mechanism when the timer reaches zero, and wherein removing power from the circuitry resets the timer.

2. The electronic talking stick of claim 1 wherein the alert mechanism is further adapted to generate audible sound, and the alert generated when the timer reaches zero is a sound.

3. The electronic talking stick of claim 1 wherein the alert mechanism generates a first alert as a yellow light emitted from the lighting mechanism when the timer counts down to a time about ten percent of the pre-programmed time period, as an alert to a person speaking and holding the electronic talking stick that time to speak is close to timing out and generates the timed-out alert as a red light when the timer reaches zero time, as an alert that time to speak has expired.

4. The electronic talking stick of claim 3 wherein the alert mechanism emits a green light when powered on and the timer begins timing down, a yellow light at the first alert, and a red light as the timed-out alert.

5. The electronic talking stick of claim 1 further comprising a microprocessor programmed to control processes of the electronic talking stick.

6. The electronic talking stick of claim 5 further comprising a USB port coupled to the microprocessor, enabling a user to program the microprocessor.

7. The electronic talking stick of claim 6 wherein the power supply is a rechargeable battery, which is chargeable through the USB port.

8. The electronic talking stick of claim 1 further comprising a speaker implemented in the electronic talking stick, wherein speech captured by the microphone is broadcast by the speaker.

9. The electronic talking stick of claim 1 further comprising wireless communication circuitry establishing communication with a remote device.

10. The electronic talking stick of claim 1 wherein wireless communication circuitry operates in a wireless protocol that provides pairing with devices operating in the same protocol, and pairs with a speaker operating in the wireless protocol external to the electronic talking stick, wherein speech captured by the microphone is broadcast by the speaker.

11. A communication system, comprising:
a computerized platform comprising a CPU, a data storage device coupled to the CPU, wireless pairing circuitry, a speaker having circuitry coupled to the CPU, and a display screen having display circuitry coupled to the CPU; and
an electronic talking stick having a body with an elongated shape from a lower end to an upper end that has a circular cross-section that diminishes in diameter from a larger lower end to a minimum diameter between the lower end and the upper end, and then expands to a larger diameter from the minimum diameter to the upper end, of a size to be held in a user's hand, and to be passed from the user to another user, a power supply powering circuitry within the body, an electronic timer operable within the body, an on/off switch for applying and removing power, a light ring implemented at the upper end around the body, adapted to emit red, yellow, and green light at specific times according to the timer, a microphone implemented under a dome-shaped audio input interface at the upper end, and a display screen implemented in the body at the upper end below the light ring to be clearly visible to the user holding the electronic talking stick upright in the user's hand, the display screen coupled to the microprocessor, displaying time remaining during countdown, and wireless communication circuitry operating in a protocol capable of pairing with devices operating in a compatible protocol;
wherein speech captured by the microphone is transmitted in the wireless protocol to the computerized platform and broadcast by the speaker in the computerized platform, and wherein, upon applying power to the electronic talking stick the timer counts down from a preprogrammed time, transmits time remaining by the wireless protocol to the computerized platform, which displays time remaining on the display of the computerized platform.

12. The communication system of claim 11 wherein speech captured by the microphone and transmitted in the wireless protocol to the computerized platform is stored in the data storage device of the computerized platform.

13. The communication system of claim 12 wherein the speech captured by the microphone and transmitted in the wireless protocol to the computerized platform is stored in the data storage device of the computerized platform, as separate files for each new person speaking.

14. The communication system of claim 12 further comprising a local area network (LAN) coupled to the CPU of the computerized platform, the LAN having at least one network-connected server and data repository, and wherein input to the computerized platform is transmitted to the at least one network-connected server.

15. The communication system of claim 14 further comprising a biometric input on the electronic talking stick, and personal profiles for individual persons stored in the data repository at the network-connected server, and wherein biometric input is used to associate input by a person speaking with information in a profile associated with the biometric input.

16. The communication system of claim 15, wherein the computerized platform is one of a smartphone, a pad device, or a laptop computer, further comprising an input system whereby a person speaking interacts with the one or more network-connected servers.

17. The communication system of claim 16 wherein the person speaking, through the smartphone, pad device, or laptop computer, accesses and plays image or audio files from a personal profile associated with the person speaking in real time while speaking with the electronic talking stick.

* * * * *